United States Patent
Strong et al.

(10) Patent No.: US 9,138,781 B1
(45) Date of Patent: Sep. 22, 2015

(54) APPARATUS AND METHOD FOR HARVESTING PORTIONS WITH FLUID NOZZLE ARRAYS

(75) Inventors: John R. Strong, Bellevue, WA (US); Richard D. Stockard, Kirkland, WA (US); Nicholas C. Tipper, Lansing, MI (US); Jon A. Hocker, Bothell, WA (US)

(73) Assignee: John Bean Technologies Corporation, Chicago, IL (US)

( * ) Notice: Subject to any disclaimer, the term of this patent is extended or adjusted under 35 U.S.C. 154(b) by 320 days.

(21) Appl. No.: 13/405,154

(22) Filed: Feb. 24, 2012

Related U.S. Application Data

(60) Provisional application No. 61/446,945, filed on Feb. 25, 2011.

(51) Int. Cl.
- B26D 7/06 (2006.01)
- B07C 1/00 (2006.01)
- B26D 7/18 (2006.01)

(52) U.S. Cl.
CPC ............... B07C 1/00 (2013.01); B26D 7/1854 (2013.01)

(58) Field of Classification Search
USPC .......... 83/99, 73, 98, 932, 100; 209/577, 576, 209/639, 644
See application file for complete search history.

(56) References Cited

U.S. PATENT DOCUMENTS

| | | | | |
|---|---|---|---|---|
| 2,129,681 A * | 9/1938 | Geibig | ................ | 239/132.3 |
| 3,216,567 A * | 11/1965 | Kelly et al. | .............. | 209/571 |
| 3,245,530 A * | 4/1966 | Kelly et al. | .............. | 209/571 |
| 3,977,526 A * | 8/1976 | Gordon et al. | ........... | 209/565 |
| 5,085,325 A * | 2/1992 | Jones et al. | .............. | 209/580 |
| 5,090,576 A * | 2/1992 | Menten | ................... | 209/587 |
| 5,259,282 A * | 11/1993 | Cothrell | ...................... | 83/99 |
| 5,295,586 A * | 3/1994 | Chesnutt et al. | ........ | 209/552 |
| 5,339,965 A | 8/1994 | Klukis | | |
| 5,482,166 A * | 1/1996 | Brown | ................... | 209/580 |
| 5,529,169 A * | 6/1996 | Wilbur et al. | ............ | 209/576 |
| 5,908,117 A * | 6/1999 | Stroman et al. | .......... | 209/639 |
| 5,937,080 A * | 8/1999 | Vogeley et al. | .......... | 382/110 |
| 6,003,681 A * | 12/1999 | Wilbur et al. | ............ | 209/639 |
| 6,164,174 A * | 12/2000 | Sigurdsson et al. | ........ | 83/13 |
| 6,549,823 B1 * | 4/2003 | Hicks et al. | .............. | 700/159 |
| 6,639,167 B1 * | 10/2003 | Bjork | ..................... | 209/587 |
| 6,891,119 B2 * | 5/2005 | Grubbs et al. | ........... | 209/587 |
| 6,928,912 B2 * | 8/2005 | Drefs et al. | ................. | 83/99 |
| 7,044,846 B2 * | 5/2006 | Eilertsen | ................. | 452/161 |
| 7,055,419 B2 * | 6/2006 | Sandberg | ................ | 83/75.5 |
| 7,262,380 B1 * | 8/2007 | Ulrichsen et al. | ........ | 209/577 |
| 7,779,735 B2 * | 8/2010 | Perini | ..................... | 83/53 |
| 8,276,490 B2 * | 10/2012 | Schmidt | ..................... | 83/77 |
| 2002/0130067 A1 * | 9/2002 | Takai et al. | .............. | 209/639 |
| 2003/0034281 A1 * | 2/2003 | Kumar | ................... | 209/579 |
| 2004/0231480 A1 * | 11/2004 | Wattles et al. | ............ | 83/401 |

* cited by examiner

*Primary Examiner* — Omar Flores Sanchez
(74) *Attorney, Agent, or Firm* — Christensen O'Connor Johnson Kindness PLLC

(57) ABSTRACT

A system for cutting a workpiece into one or more portions or final pieces, and then transferring the final pieces to a receiving location, includes a conveyor configured to support and advance workpiece, as well as a cutter configured to cut the workpiece into the final pieces. At least one fluid nozzle is positioned relative to the conveyor and selectively activatable to discharge a stream of fluid at a predetermined location(s) on the final piece, thereby to propel the final piece from the conveyor to a receiving location. A controller activates the nozzle to direct the fluid stream at the target position(s) on the final pieces.

25 Claims, 13 Drawing Sheets

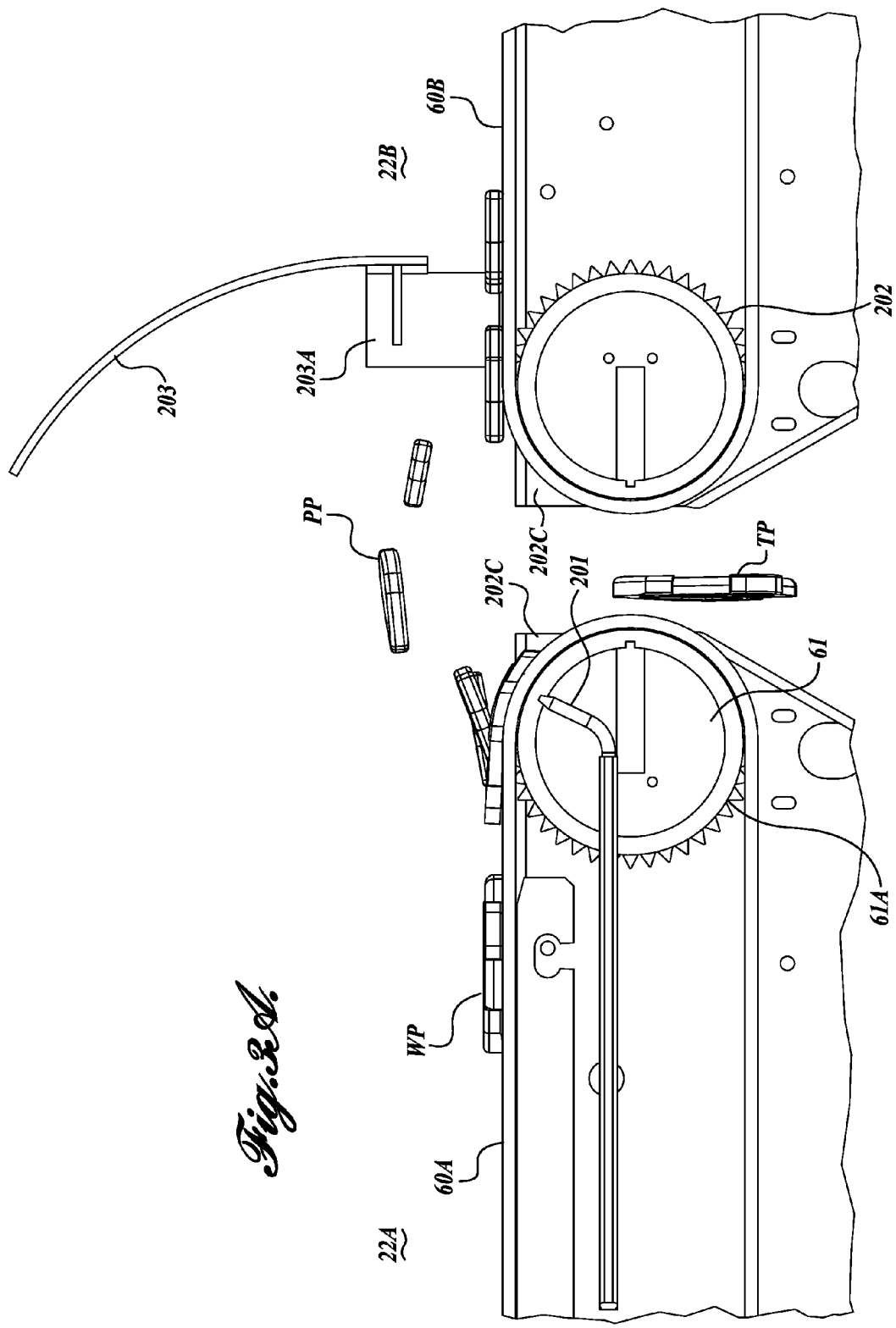

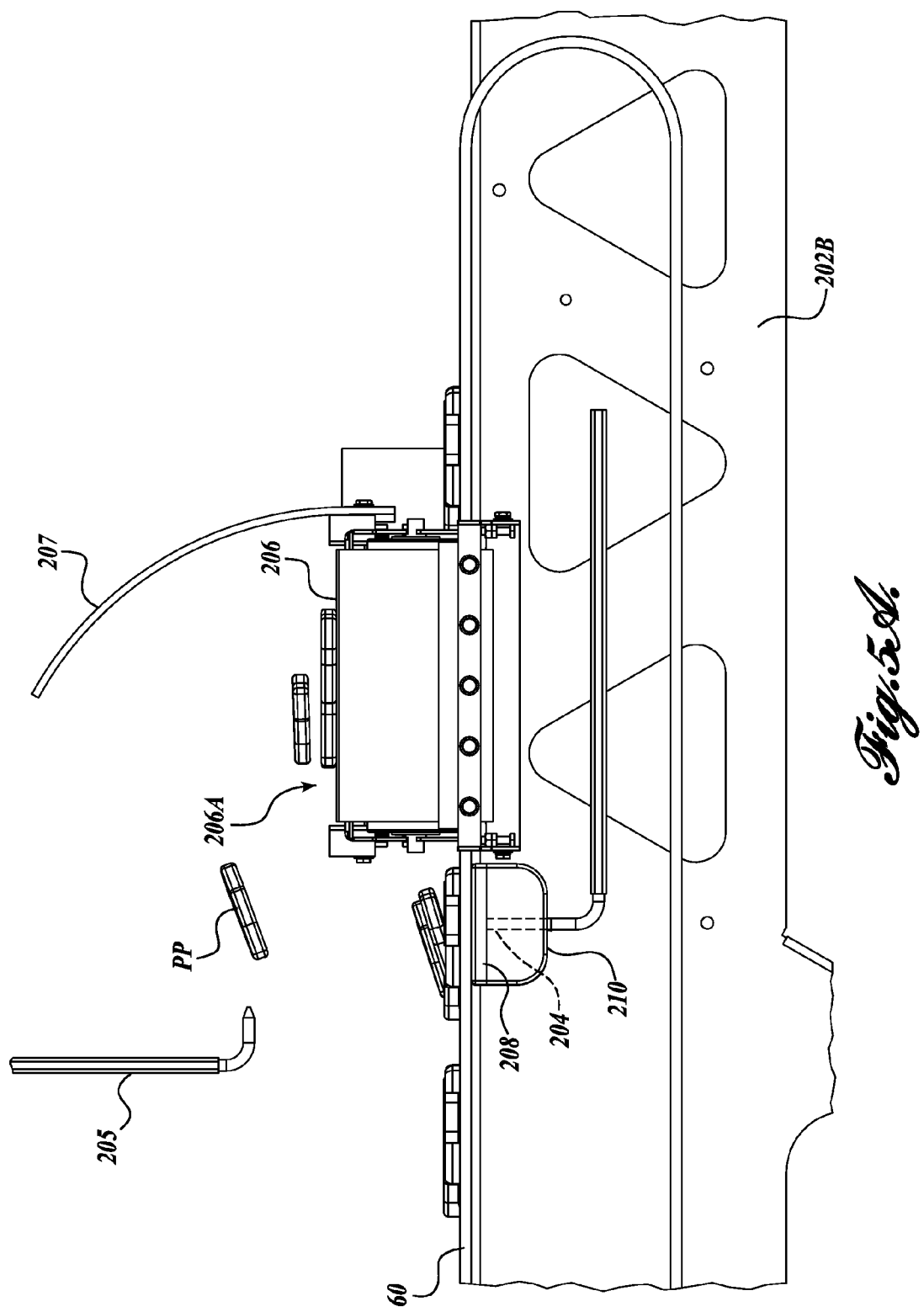

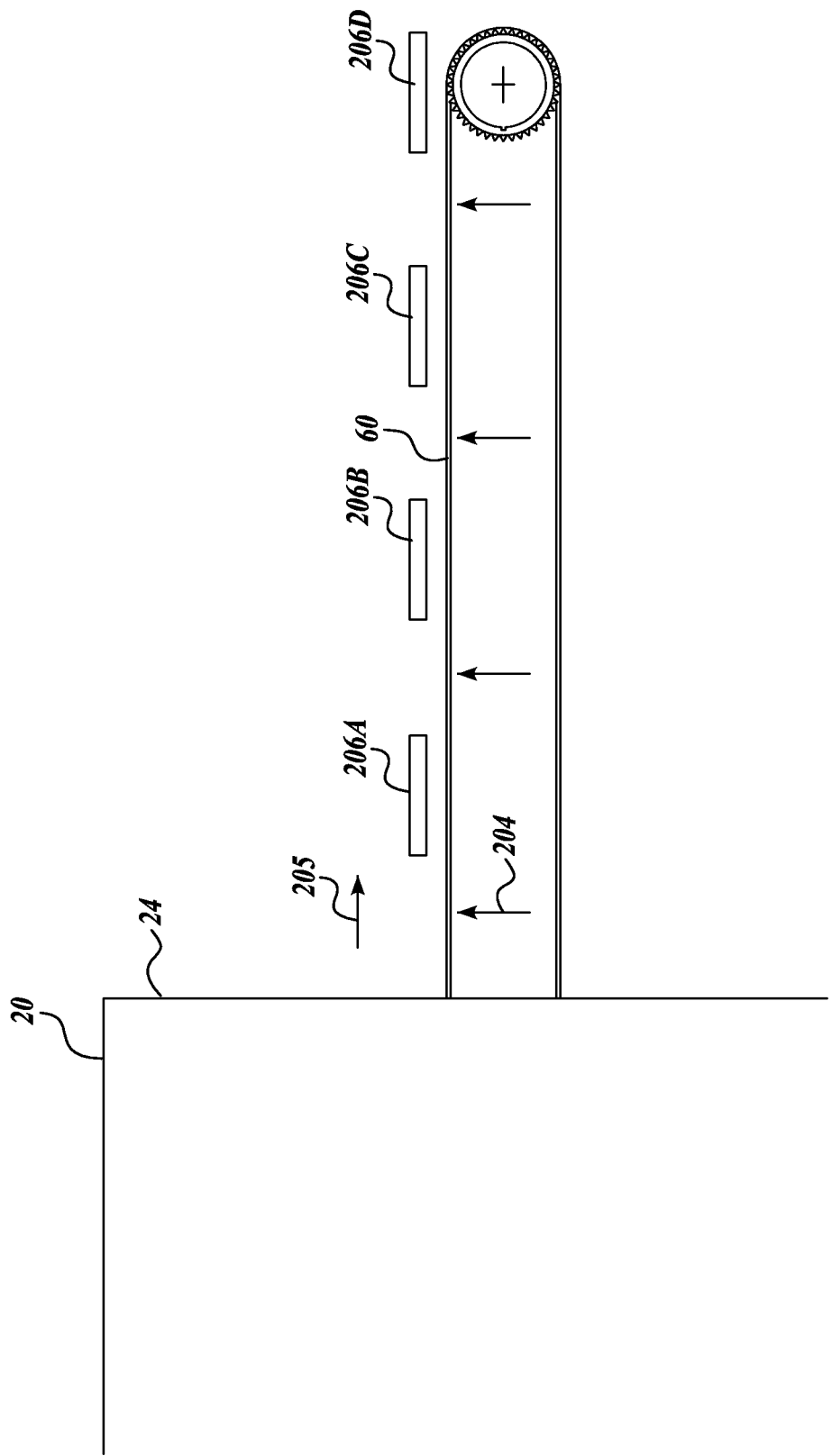

APPARATUS AND METHOD FOR
HARVESTING PORTIONS WITH FLUID
NOZZLE ARRAYS

CROSS-REFERENCE TO RELATED
APPLICATION

This application claims the benefit of Provisional Application No. 61/446,945, filed Feb. 25, 2011, the disclosure of which is hereby incorporated by reference herein.

FIELD OF THE INVENTION

The present invention relates generally to an apparatus for portioning and/or trimming workpieces, and more particularly to an apparatus for portioning or trimming workpieces by shape, weight, or other physical parameter and then automatically off-loading the portioned workpieces.

BACKGROUND OF THE INVENTION

Workpieces, including food products, are cut or otherwise portioned or sliced into smaller/thinner portions by processors in accordance with customer needs. Also, excess fat, bone, and other foreign or undesired materials are routinely trimmed from food products. It is usually highly desirable to portion, slice and/or trim the workpieces into uniform sizes, for example, for steaks to be served at restaurants or chicken fillets used in frozen dinners or in chicken sandwiches. Much of the portioning/trimming of workpieces, in particular food products, is now carried out with the use of high-speed portioning/slicing machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on a conveyor belt and a determination is made through the use of a computer as to how best to portion the chicken breast to the weights desired by the customer, so as to use the chicken breast most effectively.

Portioning and/or trimming of the workpiece can be carried out by various cutting devices, including high-speed water jet cutters or rotary or reciprocating blades, as the food product continues to travel on the conveyor. Also, slicing of the workpiece can be carried out by various well-known slicing devices. Once the portioning/trimming has occurred, the resulting final portions are separated from the trim and off-loaded from the conveyor by hand to be placed on a second take-away conveyor for further processing or, perhaps, to be placed in a storage bin. The manual offloading of portioned or final pieces is often unsatisfactory because labor is expensive and difficult to obtain, because humans make mistakes and fail to harvest all of the portions, and because it is difficult for the workers to visually distinguish between portions of similar but different specifications. As a result, the portioned/final piece may be placed onto the wrong conveyor or into the wrong storage bin or not be picked up at all. Also, the portioning of food products, especially fish, poultry or meat, typically occurs at relatively low temperatures, in the range of 40 degrees F. Performing the same repetitive off-loading tasks in this cold environment can lead to physical ailments, as well as creating an undesirable work environment. As such, relatively high worker turnover is not uncommon.

The present invention is directed at automatically portioning/slicing/cutting workpieces, including food products, and then automatically off-loading the portioned/final workpieces for further processing, for storage, etc. In addition, the present invention is capable of recognizing which particular portioned/final piece is being off-loaded so that portioned/final pieces of like weight, shape, or other physical parameter are routed to the proper off-loading conveyor, storage bin, etc, in a sorting or grading step that is accomplished by the automated offloading step.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention includes a system for automatically portioning and/or trimming and/or slicing workpieces to desired reduced sizes and then automatically removing the portioned/final workpieces for routing to other locations based on the size, weight, or other physical parameter of the portioned/final workpiece. The system includes a first conveyor having a moving support surface adapted to support and advance a workpiece to be portioned/sliced. The workpiece is cut/trimmed or sliced into one or more desired reduced size portions at a cutting/slicing station. Thereafter, arrays of fluid valves and nozzles elevate and transport the workpiece portions from the first conveyor to locations removed from the first conveyor. A control subsystem tracks the locations on the moving support surface of the workpiece portions before and after portioning/slicing and directs the valve and nozzle array timing to elevate desired portions and carry such desired portions to specific remote locations based on physical parameters or other attributes of the portioned/sliced workpiece. In this manner, like portioned/sliced final pieces are removed to the same location remote from the first conveyor.

In one embodiment of the present disclosure, the array of closely spaced nozzles are mounted under and across the width of the first conveyor, controlled individually by fast acting valves. In one embodiment, a single valve may control two or more nozzles. The pressure of the fluid will be controlled to provide the proper amount of force from the required number of nozzles. Likewise, the time the solenoid is opened will be controlled to provide the proper duration of flow at the designated pressure. The array of nozzles may be located adjacent to the outfeed roller of the first conveyor such that the direction angle of the nozzles is perpendicular to the conveyor belt as it goes around the outfeed roller (or other bend). This allows the fluid jets from the nozzles to impart momentum to the portions that creates a trajectory causing them to land a distance away from the nozzles in the down-belt direction that enables the portions to be carried away on a second conveyor.

In another embodiment of the present disclosure, the first conveyor belt has a series of bends or cascades in it which enable the angled nozzle method to be applied multiple times in one belt, with multiple additional conveyors for carrying away the products. A control system determines which portions are sorted to which conveyor by considering various physical parameters of the portions.

In another embodiment of the present disclosure, the angled trajectory of the final portions is achieved by having two arrays of nozzles in a straight section of a conveyor. The first array of nozzles is located under the belt and point approximately vertically. The second array of nozzles is located a distance above the conveyor and final portions and point generally or substantially horizontally. The timing of the two arrays is not necessarily the same, they may not be controlled by the same set of valves, and there may not be a 1 to 1 correspondence between the number of valves in each array. In fact it may be possible to have a continuous horizontal air flow across a substantial width or even the entire width of the belt that carries away any final portion elevated by the nozzles under the belt. These double arrays of nozzles are located at each location where it is desired to carry away final portions on a secondary conveyor. A control system determines which final portions are sorted to which conveyor by considering various physical parameters or locations of the final portions.

In another embodiment of the present disclosure, the first conveyor belt slides over a plate which contains, across its width, the array of fluid nozzles below the belt and further contains a broader array of orifices connected to a vacuum source. The work product seals to an extent to the first conveyor belt which seals to an extent to the plate which pulls a vacuum. Thus, the workpiece or product is held quite securely. The fluid nozzles are sufficiently powerful to overcome the pull of the vacuum on the final portions, but the trim pieces, which have no fluid jets impinging on them, are held in place. This will help overcome minor attachment of the portions to the trim, such as from surface tension and sticky fluids.

In another embodiment of the present disclosure, the angled trajectory of the final portions is achieved by having a single array of nozzles under the belt that are pointed somewhat away from vertical to impart a desired angled trajectory of the final portions. This works better with some kinds of conveyor belting than with others. This array of nozzles would be located at each location where it is desired to carry away final portions on a secondary conveyor.

In another embodiment of the present disclosure, the secondary conveyor(s) that carry away the final portions can be traveling generally parallel to or generally transverse to the direction of the first conveyor. Elevation of the secondary conveyors can be above, equal to or below the first conveyor.

In another embodiment of the present disclosure, the exact distance a portion travels as a result of the fluid nozzles depends to some extent on random interactions with the irregularly shaped flexible portion and the turbulent fluid stream which get deflected by structure in the conveyor belt. In order to better contain the portions and to minimize variations in registration on the secondary conveyors, it may be desired to add "backstops" or deflectors that catch the more energetic final portions and have them fall onto the conveyor.

In another embodiment of the present disclosure, the trim pieces are cut into pieces small enough to fall through the openings of the conveyor belt, and are blown down through the belt to leave the final portion(s) alone, on top of the belt. The final portion(s) may then be removed in any single embodiment described above, or combination so embodiments described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A and 3B illustrate an end to end transfer with an angled array of nozzles from two perspectives;

FIGS. 5A and 5B illustrate a means of using vacuum to hold the workpiece in place while a specific final portion is being propelled from the belt with the array of fluid nozzles;

FIG. 6 illustrates multiple secondary transverse conveyors on the first conveyor;

DETAILED DESCRIPTION

While illustrative embodiments have been illustrated and described, it will be appreciated that various changes can be made therein without departing from the spirit and scope of the invention.

In the present application the term "cutting" can refer to one or more of portioning, trimming, or slicing, or other cutting operations on a workpiece. In addition, specific references to a "portion" or "final portion" may refer to the result of cutting a workpiece, whether by portioning, by trimming, by slicing, etc.

Figure 1:
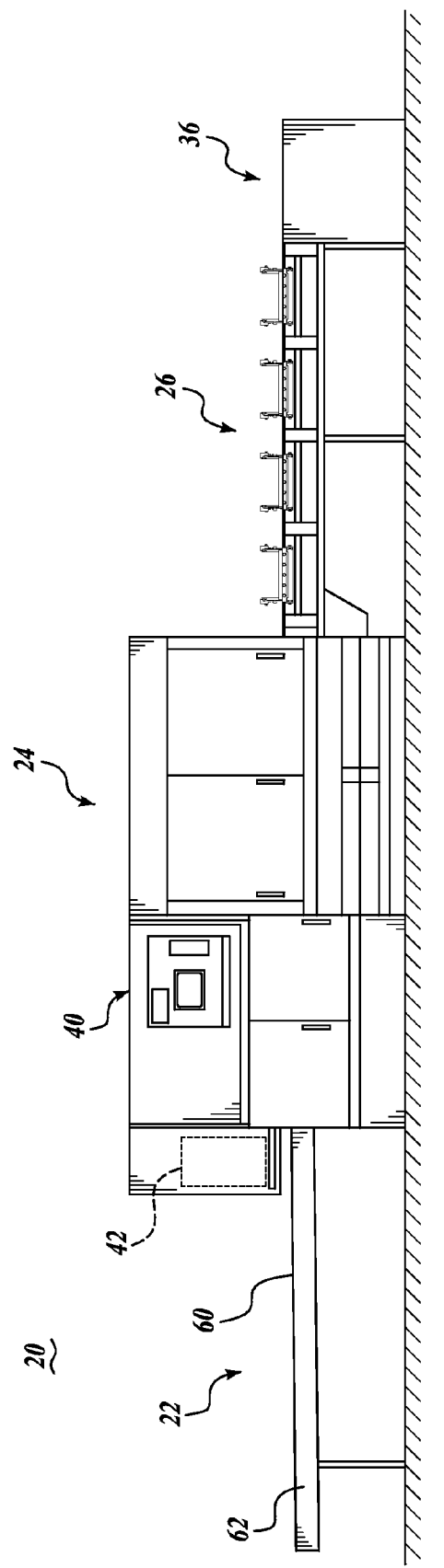
FIG. 1 is a side elevation view of a cutting machine utilized in the present disclosure.
Figure 2:
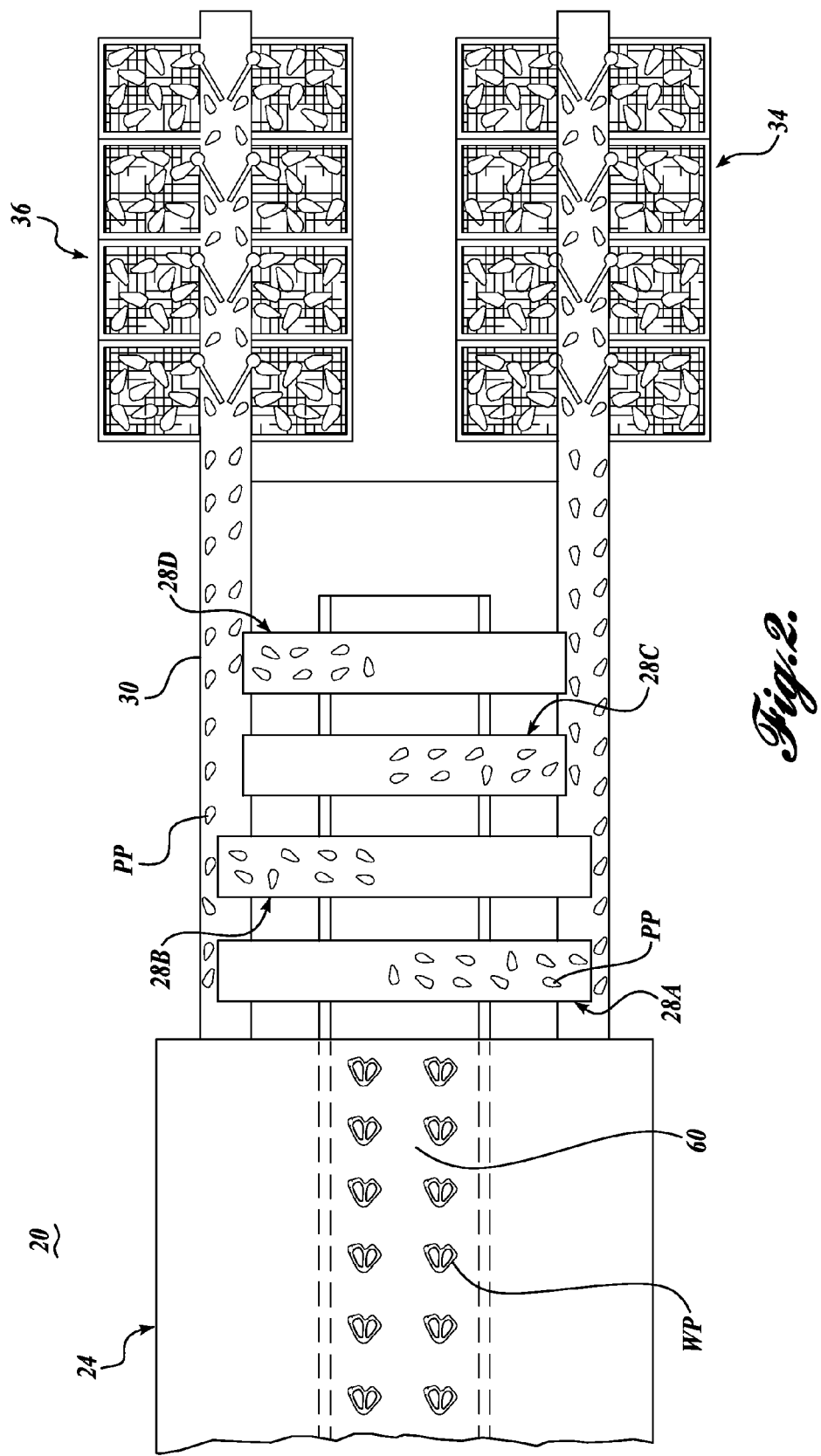
FIG. 2 is a schematic plan view of the manner in which portioned final pieces are off-loaded from the cutting machine based on physical characteristics of the final piece(s)

Referring initially to FIGS. 1 and 2 in general terms, the present invention includes a cutting apparatus 20 having a moving conveyor 22 for supporting workpieces WP to be portioned and/or sliced at an operating station 24 and to carry the portioned/sliced final pieces PP to an unloading station 26. A plurality of nozzles, for example arranged in one or more arrays, and transverse conveyors 28 transfer the final pieces PP off the conveyor 22 at the unloading station 26 and place the final pieces onto removal or take-away conveyors 30 moving outwardly alongside the conveyor 22. The removal conveyors 30 carry the final pieces PP to sorting station 36 from which the final pieces are placed into specific receiving bins or hoppers 34.

Also in accordance with the present invention, the apparatus 20 retains or keeps track of the location of each workpiece WP on the conveyor 22, and the subsequent locations of the final pieces PP on the conveyor 22 downstream of the operating station 24 as well as the locations of the final pieces on the removal conveyors 30. With this information, the proper final pieces can be automatically placed in the desired receiving bins 34 at the sorting station 36, without human intervention.

Next, describing the present invention in more detail, operating machines similar to apparatus 20 are known in the art, with the exception of the unloading station 26, which is novel to the present invention. Such machines, or components thereof, are disclosed in prior patents, for example, U.S. Pat. Nos. 4,962,568 and 5,868,056, which are incorporated by reference herein. As is typical, the operating machine includes a conveyor 22 spanning the entire length of the apparatus 20, with the conveyor having a moving belt (or belts) 60 that slides over a support structure 62 constructed in a standard manner. The conveyor belt(s) 60 is driven at a selected speed by a drive motor (not shown) in a standard manner. The drive motor can be composed of a variable speed motor to thus adjust the speed of the belt 60. The workpieces WP are carried on the conveyor belt 60 to be operated on by the apparatus 20 and then transported to the sorting station 36.

The workpieces WP are first carried by the conveyor 22 to a scanning or vision station 40 whereat the workpieces are scanned to ascertain selected physical parameters, for example, their size and shape, and then determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece WP illuminated by one or more light sources. Light from the light source is extended across the moving conveyor belt 60 to define a sharp shadow or light stripe line, with the area forwardly of the transverse beam being dark. When no workpiece is being carried by the conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe. The length of the workpiece is determined by the length of time that shadow lines are created by the workpiece. In this regard, an encoder is integrated into the conveyor 22, with the encoder generating pulses at fixed time intervals corresponding to the forward movement of the conveyor.

In lieu of a video camera, the scanning/vision station 40 may instead utilize an x-ray apparatus for determining the physical characteristics of the workpiece, including its shape, mass and weight. X-rays may be passed through the object in the direction of an x-ray detector. Such x-rays are attenuated by the workpiece in proportion to the mass thereof. The x-ray detector is capable of measuring the intensity the x-rays received thereby after passing through the workpiece. This information is utilized to determine the overall shape and size of the workpiece, as well as the mass thereof. An example of such an x-ray scanning device is disclosed by U.S. Pat. No. 5,585,603, incorporated by reference herein.

A memory unit is utilized in conjunction with a processing unit 42. Data concerning the desired workpiece WP, or final portion PP parameters/specifications, as well as the effect on workpieces and/or final portions of further processing, may be stored in the memory unit. The information stored in memory unit can readily be selected by user via a user interface, for example, when changing product lines. For instance, the user may be processing chicken breasts for a particular customer who may require specifications for the final portions to be cut/sliced from the chicken breasts. When the order for that customer is filled, the user may switch the mode of the computer to meet the specifications of a different customer. The switch may be automated and triggered by a counter that keeps track of the number of product final portions that have been processed, or the switch may be carried out manually to allow the user time to retool any apparatus or recalibrate the equipment.

The memory unit may be in the form of a database that is on a network so that the result of data from any number of machines may be combined. It may be desirable that the memory unit is "in the cloud" so that results of the summing of data from more than one machine may be more easily available.

The data information measured/gathered by the scanning devices is transmitted to a computer 42, preferably on board the apparatus 20, which records the location of the workpiece on the conveyor as well as the shape and other parameters of the workpiece. With this information, the computer can model the workpiece as well as determine how to optimally cut or portion or slice the workpiece at the operating station 24. The cutting may be carried out by various types of cutting/portioning devices including high-pressure water jets as disclosed in U.S. Pat. Nos. 4,875,254; 5,365,186 and 5,868,056, incorporated by reference herein. Other types of cutting devices may be utilized, including band saws, reciprocating saws, circular saws, guillotine knives, and lasers. Workpieces can be portioned in accordance with desired parameters or characteristics of the portions, including weight or area, as well as maximum fat content or thickness and other parameters such as width or length.

Figure 8:
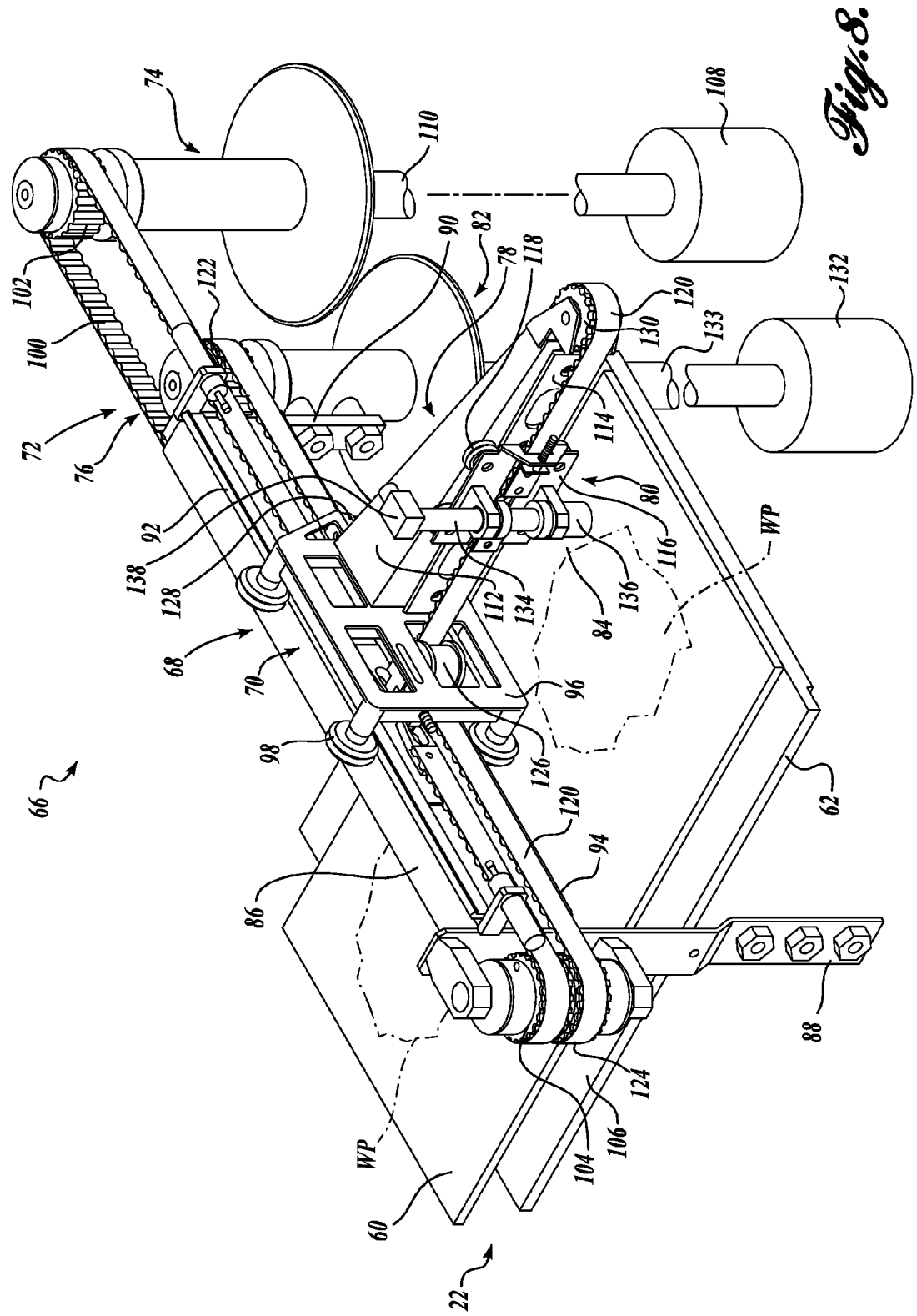
FIG. 8 is a schematic view of a high speed fluid nozzle and a carriage therefore used in the portioning station shown in FIG. 1.

FIG. 8 illustrates one particular cutting apparatus 66 located at station 24 that may be utilized in conjunction with the present invention. The apparatus 66 in basic form includes a support structure 68 extending across the conveyor 22 for supporting and guiding a carriage 70 for movement transversely to the direction of movement of the conveyor. The carriage 70 is powered by a drive system 72 including in part, a motive system 74 and a drive train 76. A second, longitudinal support structure 78 is cantilevered outwardly from carriage 70 in a direction generally aligned with a direction of movement of the conveyor 22. A second longitudinal carriage 80 is adapted to move along longitudinal support structure 78 by the drive system 72. In this regard, a second motive system 82 powers the longitudinal carriage 80 through the drive train 76. A high-speed fluid jet nozzle 84 is mounted on the longitudinal carriage 80 to move therewith as the nozzle operates on (cuts) the underlying workpiece WP being carried by the conveyor 22.

As shown in FIG. 8, the transverse support structure 68 includes a beam structure 86 that extends transversely across the conveyor 22 at an elevation spaced above belt 60. The ends of the beam structure 86 are supported by brackets 88 and 90 extending upwardly from the conveyor's support structure 62. The support structure 62 also includes a track for guiding the carriage 70 along beam structure 86, composed of an upper rail 92 and a lower rail 94 attached to the face of beam structure 86 facing the carriage. The carriage 70 includes a generally rectangularly shaped bed portion 96 with rollers 98 attached to the corners of the bed portion.

The carriage 70 is powered to move back and forth along beam structure 86 by motive system 74. In this regard, a timing belt 100 extends around a drive pulley 102 located at the upper end of motive system 74, and also around an idler pulley 104 of an idler assembly 106 mounted on the upper end of bracket 88. The belt 100 makes a loop around beam structure 86, extending closely along the side walls of the beam, with the ends of the belt connected to the back side of carriage bed 96.

The motive system 74 includes the servo motor 108 controllable by computer 42 to move the carriage 70 back and forth along beam structure 86 as desired. A drive shaft 110 extends up from the servo motor 108 to power the drive pulley 102. As further shown in FIG. 8, the longitudinal support structure 78 cantilevers transversely from carriage 70 to be carried by the carriage. The support structure 78 includes a beam member 112 that tapers in the direction of its distal end. An elongate track 114 extends along the side of the beam member 112 for guiding the longitudinal carriage 80. The carriage 80 includes a substantially planar, rectangularly shaped bed portion 116 and rollers 118 at each of its corners adapted to ride along the upper and lower edges of track 114.

Carriage 80 is moved back and forth along track 114 by drive system 72. In this regard, the drive system includes a second motive system 82, constructed similarly to motive system 74, to power a timing belt 120 which is trained around a drive pulley 122 mounted on the upper end of motive system 82 and also trained around an idler pulley 124, which is located below idler pulley 104. The belt 120 also trains around idler pulleys 126 and 128 mounted on carriage 70. A further idler pulley 130 is mounted on the distal end of beam 112. The ends of the belt 120 are attached to the bed 116 of carriage 80 so that rotation of the drive pulley 122 results in movement of the belt 120, which in turn causes transverse carriage 80 to move along track 114. As with motive system 74, ideally, motive system 82 includes a servo motor 132, which is drivingly engaged with drive pulley 122 by a drive shaft 133.

A cutting tool in the form of a high-pressure liquid nozzle assembly 84 is mounted on the longitudinal carriage 80 to move therewith. The nozzle assembly includes a body portion 134 that is secured to the carriage bed 116. The nozzle assembly 84 also includes a lower outlet tip 136 directed downwardly towards conveyor belt 60. An entrance elbow 138 is attached to the upper end of the nozzle body 134. High-pressure liquid nozzles of the type of nozzle assembly 84 are articles of commerce. High-pressure fluid, such as water, is supplied to nozzle assembly 84 by supply lines, not shown, in a manner well known in the art.

In operation, as workpieces WP are carried along conveyor 22, the nozzle assembly 84 is moved along selected paths of travel by carriages 70 and 80 powered by drive system 72. Carriage 70 moves the nozzle 84 transversely, and carriage 80 moves the nozzle longitudinally relative to the direction of travel of the conveyor 22. This enables the nozzle to travel quickly along complicated routes which are programmed into the operation of the servo motors of the motive systems 74 and 82 by computer 42.

Figure 3B:
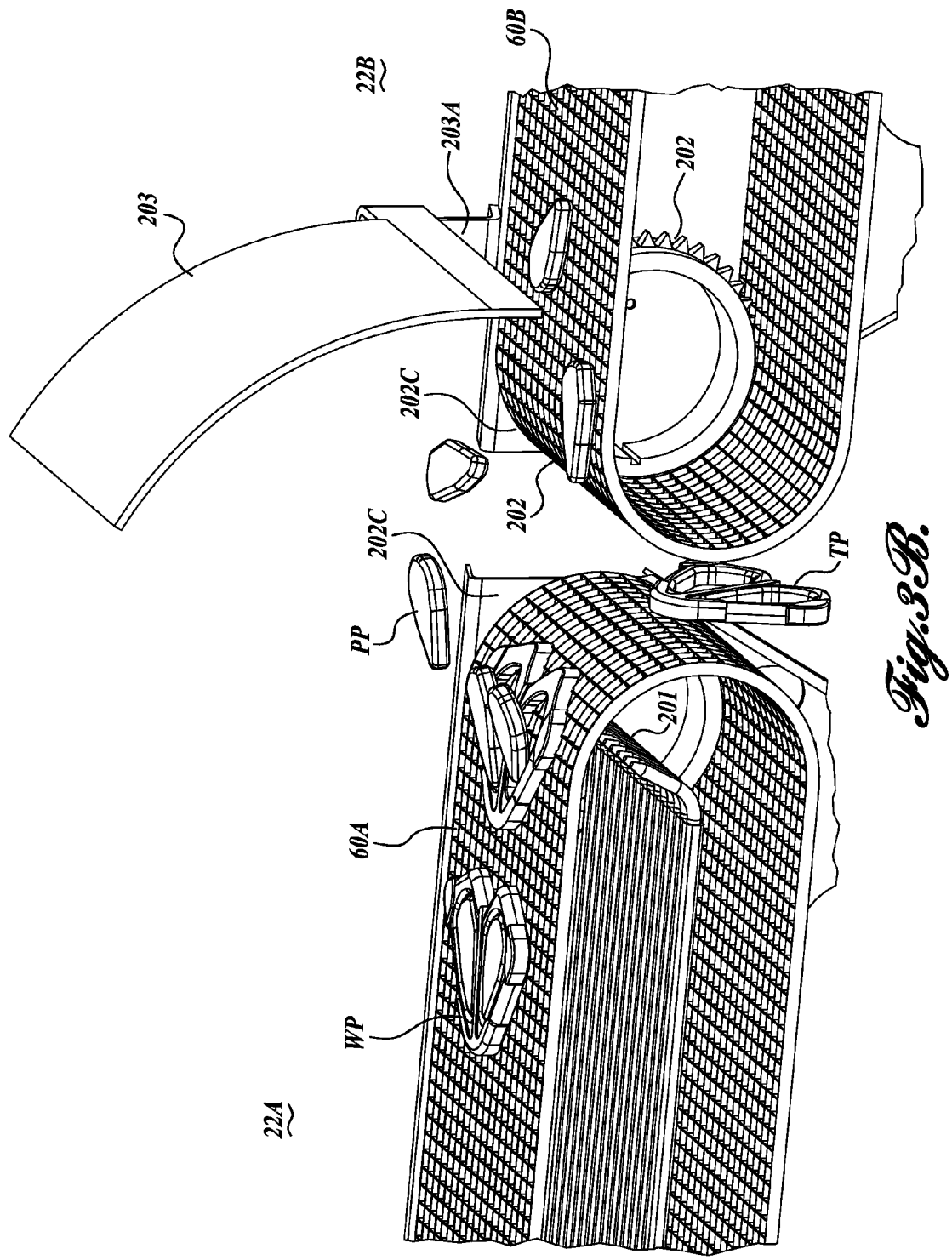

As seen in FIGS. 3A and 3B, an array of fluid nozzles, for example compressed air nozzles 201, controlled by an array of solenoid valves (not shown) are mounted under and across the width of the first conveyor belt 60A of a conveyor first section 22A, where the belt starts bending around the end of the conveyor section. Fluid, for example compressed air, blows through selected nozzles at an appropriate pressure for an appropriate time and with appropriate timing to launch portions PP, onto a second conveyor belt 60B of conveyor section 22B of conveyor 60, to be carried away for further processing. That is, the fluid may blow through one or more nozzles at specified times to cause portions PP to be moved onto the second conveyor belt 60B. The trim material TP falls between the two conveyor sections 22A and 22B into bins or onto a third conveyor (not shown) for separate processing. Due to the somewhat random nature of the trajectory of the portions PP, it is desirable to limit the maximum travel of the portions PP with a backstop 203.

Backstop 203 is illustrated as being of a curved sheet member or structure that extends upwardly from an angle shaped support bracket 203A, which in turn is attached to the support structure 202B of conveyor section 22B. As shown in FIG. 1, the bracket 203A is able to support the backstop 203 in cantilevered fashion so that the bottom edge of the backstop is spaced above the surface of belt 60B so as not to interfere with the portions PP being carried by belt 60B, see FIG. 3A. The backstop 203 may be made from numerous different types of materials, preferably material that the portions PP do not adhere to, and also material that may be easily cleaned, for instance a non-corrosive metal such as stainless steel. Other alternative materials may include plastic materials or plastic composites. Also the backstop 203 is shown as curved so that a concave face is directed toward the portions that are being launched from a first section of conveyor section 22A to a succeeding section of conveyor section 22B. With this curvature, if a portion PP is projected against the backstop, the curvature of the backstop induces the portion to drop downwardly onto belt 60B. Also, although the backstop 203 is illustrated as being of solid construction, the backstop may instead be formed from nonsolid material so as to define openings or apertures so that it is possible to look through the backstop, if desired.

Further, although the backstop is shown as being of rigid construction, it could instead be formed from flexible material or elastic material that may assist the portions PP to retain their original shapes to a greater extent than if impacted against a rigid, unyielding backstop.

In order to leave the trim undisturbed, the timing of the air through the selected nozzles will be such that the fluid jets do not blow outside the perimeter of the portions PP. The spacing of the nozzles 201 will be appropriate to align with the openings in the mesh type conveyor belt 60A.

In some embodiments, the array of nozzles 201 may be moveable in any direction relative to the conveyor belt 60A. In this regard, each nozzle may be individually pivotable or aimable. To be pivotable, movable and/or aimable, the nozzles 201 may project from base portions that are powered or actuated so as to enable the nozzles to be moved in desired directions very rapidly. Such mounts and actuators for nozzles 201 are standard articles of commerce. Actuators that may be utilized with nozzle 201 can be from various commercial sources, such as from Linmot, Exlaror or Indramat.

The array of valves for controlling the air flow from nozzles 201 could be of many different types in terms of drivers (solenoid, motor, diaphragm, piezo, etc), direct acting or not, and various means of stopping the flow (gate, ball, etc). Preferably, direct acting solenoid valves will be used because of their fast and consistent speed, high reliability, easy control and low cost. Such solenoid valves are articles of commerce. The valves can be individually wired from the processor 42 or a controller, or preferably, mounted on a common block with one network connection from the controller. The controller may be configured to individually activate each valve in the array of valves.

As noted above, nozzles 201 can be positioned as an array extending across the width of belt 60A. Moreover, the particular nozzles required to propel the portion piece PP from conveyor belt 60A to conveyor belt 60B may be controlled by the valves described above. This arrangement of fixed nozzles can work quite satisfactorily, especially if the position, shape and other information is accurately known with respect to the portion pieces PP, and also perhaps the workpiece WP. As a result, selected nozzles need only to be timely actuated in order to lift the portions PP off belt 60A and through the air sufficiently to land on belt 60B.

As also noted above, the nozzles 201 can be configured to be movable, perhaps in two directions, laterally with respect to the belt 60A and also angularly in an up-and-down or vertical direction. As such, the nozzles 201 can be directed to the proper location(s) on the portions so as to cause the portions to be elevated into the air and propelled toward the conveyor belt 60B. The locations on the portions in which the fluid should be directed is discussed more fully below. One advantage of being able to direct or move the nozzles 201 is that potentially a fewer number of nozzles would be required than if the nozzles were stationary, wherein the endeavor is to activate the correct nozzle depending on the location, shape, etc., of the portion PP. It will be appreciated that the nozzles 201 would not have to be moved very far or to any great degree, and thus the actuator for moving the nozzle would only require a very short stroke.

Although conveyor belt 60B is illustrated as of the same open mesh construction as conveyor belt 60A, conveyor belt 60B could be of other constructions, for example, the upper surface of the conveyor belt 60B can be configured to increase the friction or ability to grip portions PP that land on the conveyor. For example, the upper surface of the conveyor can be constructed so as not to be smooth, but textured, with ridges or other projections so as to impinge and grip the portions PP. Moreover, idler roller 202 used with conveyor belt 60B that might have projections that extend above the elevation of belt 60B so as to impinge against the underside of portions PP that are "ejected" from conveyor belt 60. As a consequence, the entire portion PP does not have to span the gap between conveyor belt 60A and conveyor belt 60B, rather, as long as the leading or forward end of portion PP reaches roller 202 or belt 60B, then the portion will not fall down through the gap between the discharge end of conveyor belt 60A and the adjacent end of conveyor belt 60B.

Further, the belt 60B, at least the section of the belt adjacent conveyor section 22A, could be operated at a faster speed than belt 60A. As such, if the portion PP at the same time is supported by belt 60A as well as belt 60B, the faster speed of belt 60B would tend to cause the portion PP to leave the belt 60A and travel with the belt 60B. In this way, the belt 60B wins the "tug of war" between the two belts. It will be appreciated that belt 60B can be of a design wherein only the end of the belt adjacent the belt 60 is operating at a faster speed, and whereas the opposite end of belt 60B operates at a relatively slower speed.

As noted above, in FIGS. 3A and 3B, the nozzles 201 are illustrated as positioned in the envelope of the outfeed roller assembly 61. The roller assembly includes sprockets 61A used to drive belt 60A. The sprockets 61A can be located where nozzles 201 are not necessary, including along the side margins of belt 60A. Moreover, if the belt 60A is being used as a dual or triple lane belt, the sprockets 61A may be positioned between the lanes, where workpieces would not be positioned.

Typically in conveyors of the nature of conveyor 22, support or side rails 202C extend along the sides of the conveyor to prevent workpieces being carried along the conveyor from moving laterally off the conveyor. However, it may be desirable at the location of nozzles 201 or at the location of other nozzles, described more fully below, to not utilize side rails along the conveyor belt. The reason for this modification is that portions may have "strings" of product extending from the portions, especially if the cutting of a portion from the workpiece was not accomplished in a fully complete or "clean" manner. These product strings can become trapped between the edges of the moving conveyor and the side rails 202C.

As noted above, the trim material TP falls between the two conveyor sections 22A and 22B into bins or onto a third conveyor for separate processing. As an alternative, the trim pieces could be cut into small enough pieces at station 24, or at a subsequent station, thereby allowing the cut-up trim pieces to fall through openings in belt 60A. In this regard, fluid, such as air, can be utilized to help force the trim pieces through the belt 60A and onto a take-away conveyor or other means for transporting away. In this fashion, the final portions alone are left on the belt 60A for subsequent transfer. Thus, in this situation, the pressurized fluid acts on the trim pieces, and may not be required to act on the portioned piece.

Figure 4A:
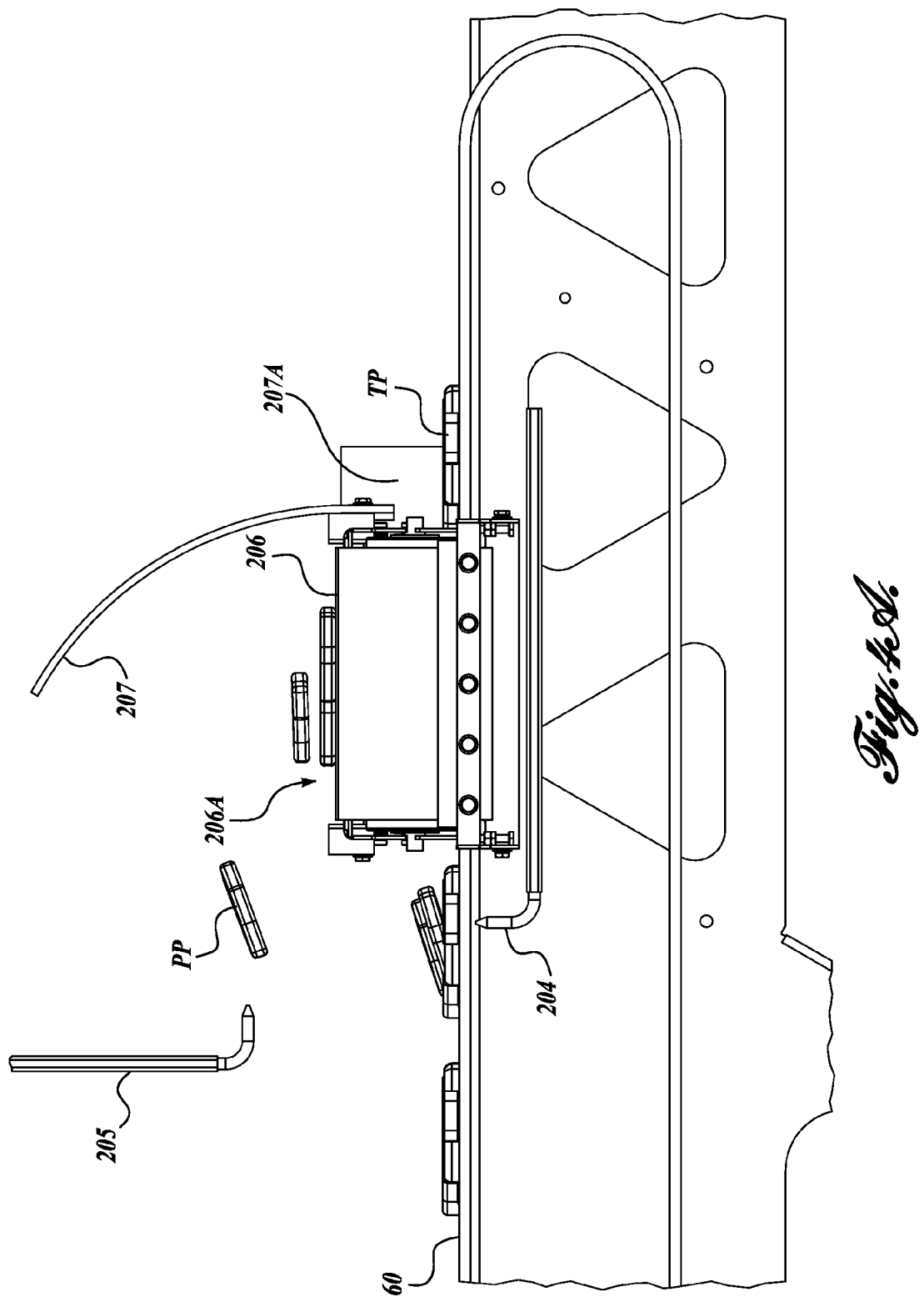
FIGS. 4A and 4B illustrate transfer onto a transverse conveyor with two arrays of nozzles from two perspectives.
Figure 4B:
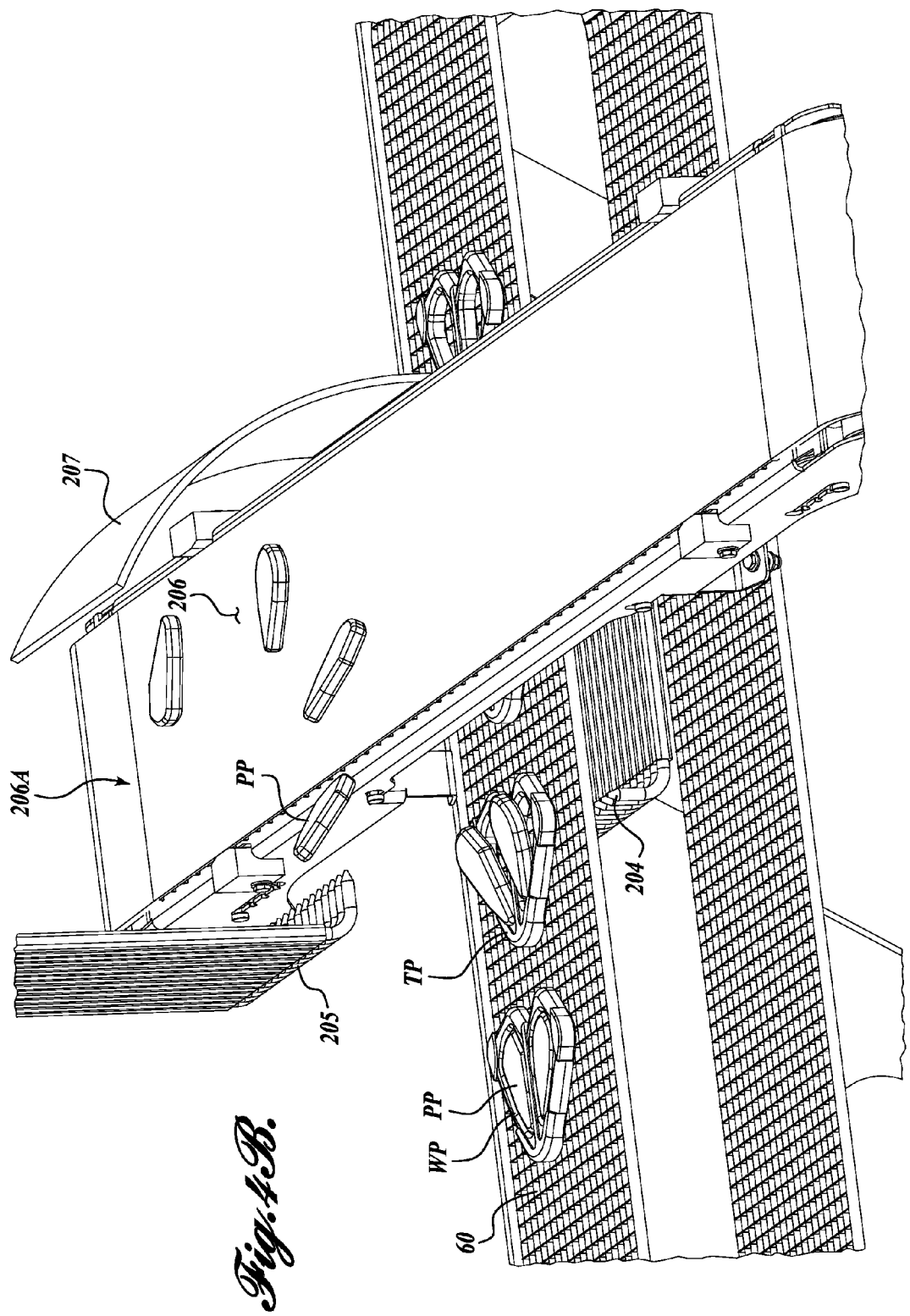

As seen in FIGS. 4A and 4B, two arrays of nozzles 204 and 205, controlled by two arrays of solenoid valves (not shown), are used to blow/propel the portions PP from the conveyor belt 60 to a belt 206 of a transverse conveyor 206A. The trim material TP continues down the conveyor belt 60 for further processing. The array of nozzles 204 and 205 may be less than, equal to, or greater than the width of the conveyor belt 60.

The number of nozzles in the two arrays may be different. For instance, the array 205, in the horizontal direction, may have fewer nozzles that expel air or other fluid in a broader pattern. The reason that fewer but broader pattern nozzles 205 can be considered is that portions PP may be lifted from the conveyor 202 by nozzle array 204 directed in the upward direction. Array 205 serves to move the elevated portions PP horizontally onto the transverse conveyor 206. Using very few nozzles but with a broad expelled fluid pattern requires more compressed air or other fluid, while using more and narrower nozzles increases complexity and cost. The timing of the fluid expelled from one or more of the nozzles in the nozzle arrays 204 and/or 205 may be different. Also, the horizontal nozzle array 205 could be replaced by a high pressure fan and duct/nozzle that blows horizontally over the entire width continuously or intermittently.

Due to the somewhat random nature of the trajectory of the portions PP, the maximum travel of the portions is limited by a backstop 207. Backstop 207 may be constructed and supported similarly to the construction and support of backstop 203.

Figure 5B:
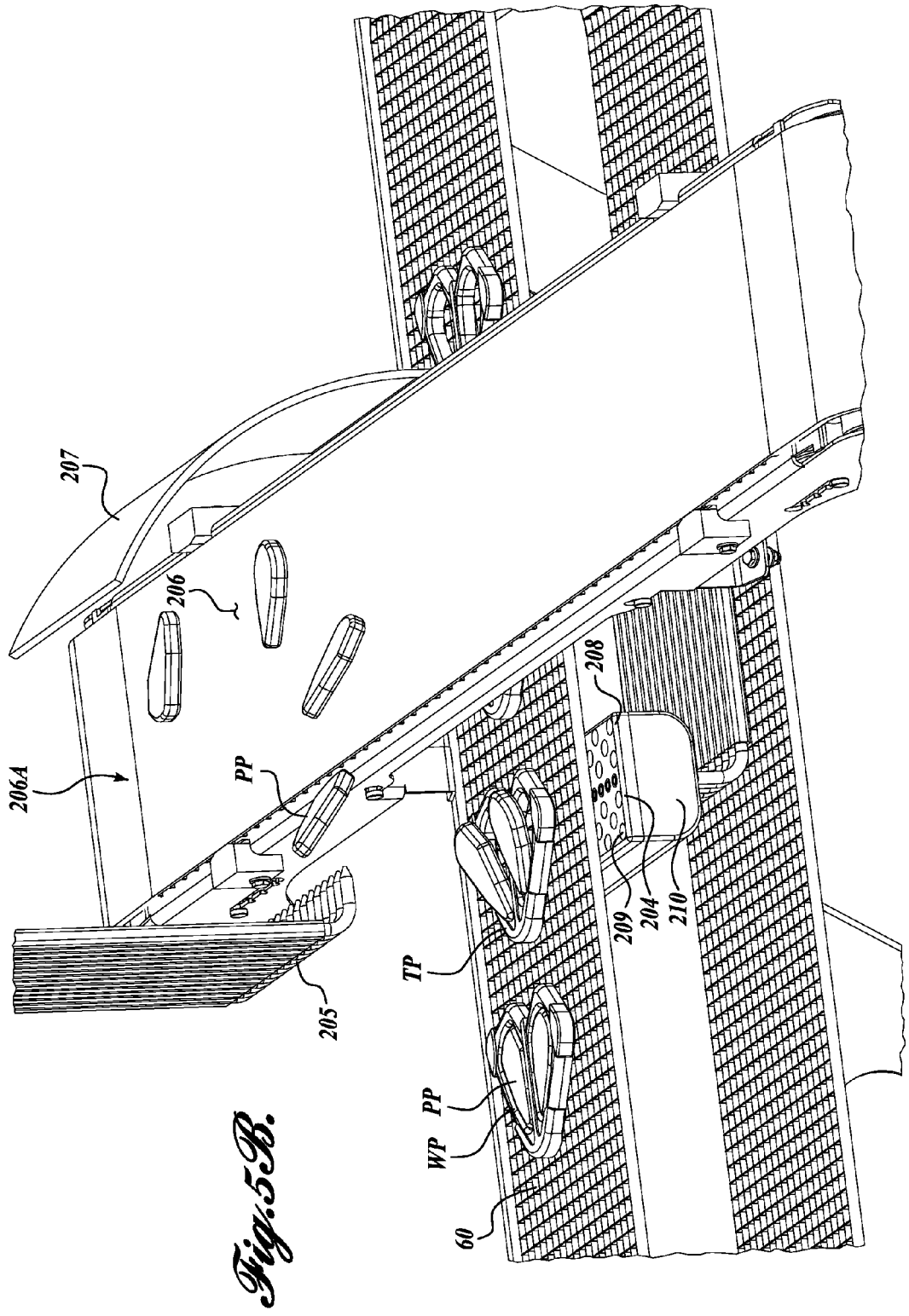

FIGS. 5A and 5B show a system that assists in separating the portions from the trim by holding the trim against the first conveyor belt 60 with vacuum. The belt 60 rides on a plate 208 positioned beneath and extending transversely of belt 60. The plate 208 mounts (or is machined into) the array of compressed air nozzles 204. The plate 208 also has a series of orifices 209 in a spacing corresponding to the spacing of the openings in the belt material, through which vacuum supplied to manifold 210 is communicated through the belt and into the workpiece WP. The vacuum holds a broad area of the workpiece WP, while the compressed air nozzles 204 apply force to the portions PP. While FIGS. 5A and 5B show a straight plate 208 and conveyor belt 60, the same concepts will work with a curved plate and conveyor belt as well.

An alternative approach is to have both fluid pressure and vacuum available to the orifices 209, applying whichever is needed at each instant to hold trim and elevate selected portions. Another alternative is to continue separating the vacuum and pressure functions, but provide valves to selectively turn the vacuum on and off of the vacuum orifices 209.

FIG. 6 schematically shows the system of FIGS. 4A and 4B repeated multiple times down the length of the conveyor belt 60, four times in the drawing. Doing this makes it possible to select and separate multiple categories of portions PP. Since control is from the portioner computer 42, the position and all attributes of each portion are known. Some examples of how to use this sorting capability and knowledge of attributes and positions are as follows:

1. The portioner can produce different specifications of portions PP at the same time such as a triangular shaped portion weighing between 65 and 80 grams to be later coated and fried and sold in restaurant brandxand an ovalshaped portion weighing between 90 and 105 grams to be later grilled and sold in restaurant brand y. The portioner automatically selects which specification to cut from each incoming workpiece WP based on, for example, whether or not it will fit or have a high yield. It is desired to harvest all of the first specification portions onto a first transverse conveyor, for example, conveyor 206A, and all of the second specification portions onto a second transverse conveyor 206B.

2. The portioner splits the variable incoming workpieces in half and trimming fat from the exterior of the workpiece in order to sell the portions PP as a retail "fat free" product. Each resulting portion PP has a different weight. It is desired to sort these portions into categories of under 70 grams, 70 to 90 grams, 90 to 110 grams, and over 110 grams for selling into different markets. Each category can be harvested to its own separate transverse conveyor 206A, 206B, 206C, 206D. It will be appreciated that by this construction, portions PP can be simultaneously harvested and separated without complicated or elaborate sorting systems or mechanisms.

3. The portioner can portion two lanes of workpieces WP into several different categories or specifications. Further, each workpiece is being portioned into two portions PP plus trim TP, with the portions coming from the left and right sides of the workpiece. It is desired to do a final complex sort into many categories a little bit remote from the portioner. To do this later sort, it is necessary to know the order and approximate position of each portion. Since left and right portions from left and right lanes of workpieces could easily lose their order if all harvested on top of each other, it is necessary to separate these categories. In FIG. 2, for example, the first transverse conveyor 28A takes away right portions from right lane workpieces, the second transverse conveyor 28B takes away left portions from left lane workpieces, the third transverse conveyor 28C takes away left portions of right lane workpieces and fourth conveyor 28D takes away left portions from the left lane workpieces. The product streams from these four transverse conveyors eventually lead to their own further sorting stations, using the order and approximate position and with knowledge of the physical attributes of each portion.

Figure 7:
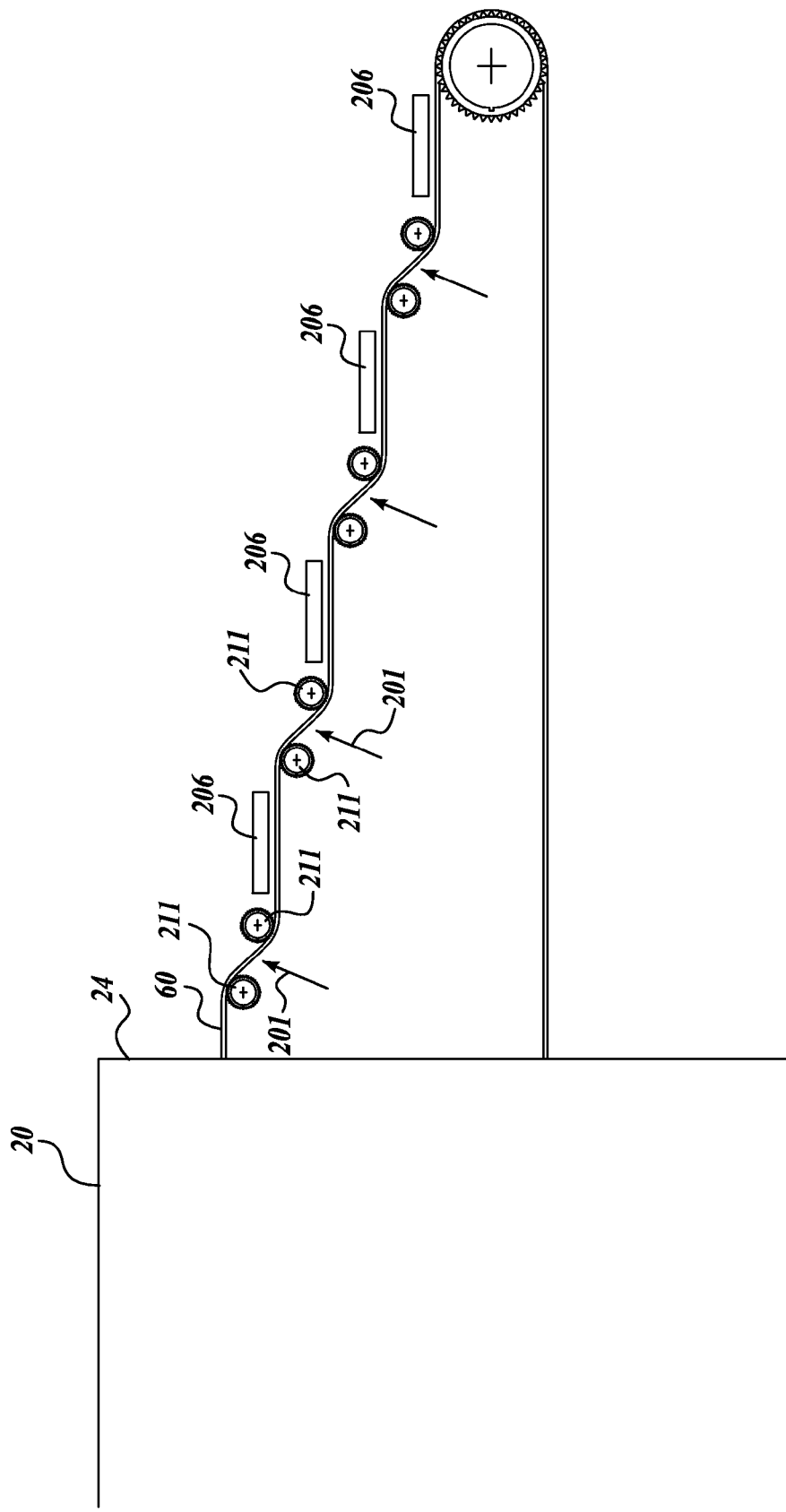
FIG. 7 illustrates a "cascade" approach to having multiple secondary transverse conveyors.

FIG. 7 schematically shows the first conveyor belt 60, arranged in a series of "cascades" with an array of nozzles 201 and a transverse conveyor 206 at each cascade. This is using a nozzle arrangement similar to that of FIGS. 3A and 3B with the multiple transverse conveyors 206A, 206B, 206C, 206D of FIG. 6. Guides or rollers 211 force the belt through the cascading path. The sorting control possibilities are the same as the system of FIG. 6.

Referring to FIG. 1, the control subsystem includes a processor 42 and a vision system 40 to identify and keep track of the position of the portions PP in workpiece WP, including extent of the perimeter, mass, area centroid, mass centroid, etc, such that the selection of which valves to turn on, when to turn them on and how long to leave them on (not necessarily all the same duration or timing) is a function of the position and other parameters. In most cases, the air or other fluid nozzle flow pattern produced will be at targets located interior to the outer perimeter of the portion to avoid movement of other portions PP or trim TP. In this regard, the one or more nozzles of arrays 201, 204, 205 can be activated to produce a short and powerful blast of fluid.

In one embodiment, one or more nozzles of arrays of the present disclosure, for example arrays 201, 204, 205, are activated to blow air at a target located at or near the centroid of a final portion. That is, the one or more nozzles are activated to blow at an acceptable region near the centroid that provides good momentum transfer from the fluid blast to the final portion. As an alternative, two or more nozzles may be activated to blow fluid to targets corresponding to acceptable regions that substantially balance the centroid of the final portion. The centroid of the final portion PP can be calculated by the processor 42 using the data received from the vision system 40. One example of determining the centroid of a portion PP of the final portion PP is described in U.S. Pat. No. 7,452,266, incorporated herein by reference.

It is important that the fluid blast be directed to the correct location(s) on a portion to be transferred from one conveyor to another. If the fluid jet is "off center," the portion may not even become airborne, but instead might flip to one side and rotate about the edge of the portion PP furthest from the impact location of the fluid jet on the workpiece.

Further, even if the portion PP becomes airborne and actually reaches the take-away conveyor, it might land on an existing portion already on the take-away conveyor rather than landing on a more desirable location separated from any other portions already on the take-away conveyor. Also, if the fluid blast is not directed to the centroid or balanced about the centroid, then the portion may not follow the desired trajectory to the take-away conveyor belt, and may completely miss the take-away conveyor. Also, if the fluid blast is "off the mark" the portion may be rotated when airborne, and thereby land on an edge, rather than in the same orientation that it left the prior conveyor belt. Also, if the fluid blast is not correctly applied, the portion likely will at best become "mis-sorted". In some cases these portions may land on the wrong conveyor and end up as trim. In other cases the portions may even fall to the floor or onto the machinery where the portions must be manually recovered and either manually directed to un-edible product, or manually directed to trim or the correct category.

Rather than cutting relatively large portions PP from one workpiece WP, as shown in FIGS. 3A and 3B, workpieces may be divided into several very small portions, such as chicken nuggets, which are sometimes grouped together in a certain area of a workpiece to form a nugget region. The nuggets can be harvested such that the nugget region forms the workpiece portion to be transferred from a conveyor by all of the methods described herein.

It is to be understood that the sorting to different groupings of physical parameters can be accomplished by timing of the nozzles of the arrays such that different groupings are deposited on different conveyors. If there is only one nozzle array, then all portions will simply be separated from trim.

Also, the sorting to different groupings of physical parameters of portions can be done later with additional sorting equipment using knowledge of the position of each portion on the secondary conveyors, such as conveyors 28A, 28B, 28C and 28D. In this case, multiple portions from one workpiece can be first separately loaded on different secondary conveyors to eliminate overlaps and confusion on order, and then later sorted with additional sorting equipment.

Further, some or all of the secondary conveyors can be replaced with containers or bins, such as the 34, 36 shown in FIG. 2, for collecting portions and/or chutes leading to bins or other collection points.

As can be appreciated, complete cuts of the perimeter of the portions PP are necessary for the fluid jet harvesting technique to work well, even cutting through areas with tendons and other connective tissue. This can be achieved with any of or combinations of the following techniques: water pressure in excess of 60,000 pounds per square inch, water jet nozzles that entrain air into the water jet thereby breaking up the continuous stream of water, orifice sizes of 0.007 inches or larger, slowing down the cutter movement speed at known anatomical locations of connective tissue and passing the cutter(s) repeatedly over the same area of known anatomical locations of connective tissue.

A conveyor can include a belt having an opening at pitch of, for example, 0.5 inches. Such belts are standard articles of commerce. Also, an example of such a belt is disclosed by U.S. Pat. No. 5,415,274, incorporated herein by reference. In this embodiment, the array of nozzles may be arranged across the belt in pairs. That is, traversing the belt may be pairs of nozzles spaced apart in the longitudinal direction of the belt. The spacing between the pair of nozzles may correspond to the spacing of the openings in the belt. For instance, in one embodiment, the pair of nozzles may be spaced apart 0.5 belt pitches or, alternatively, 1.5 belt pitches. Further, if the belt has an opening pitch of 0.5 inches, the pair of nozzles may instead be spaced apart 0.25 inches or 0.75 inches. By spacing the nozzles apart at 0.025 inches or 0.725 inches, wherein the nozzles are spaced at 0.5 or 1.5 belt pitches apart, the nozzles for the most part should be able to expel a flume of fluid unimpeded by the cross rods, pickets, or other components of the conveyor belt. While utilizing an array of two nozzle pairs extending across the conveyor belt increases the number of required nozzles as well as fluid consumption, such arrangement could significantly increase the reliability of harvesting the portions PP produced by apparatus 20.

The nozzle of the array of nozzles of the present disclosure, for example nozzles 201, 204, 205, can be of various types. For example, slot nozzles can be used that expel fluid from a long narrow opening rather than a circular opening. The long direction of the slots may be oriented down belt or along the longitudinal direction of the belt. The length of the slots may correspond to the length of the opening pitch on the belt.

As noted above, the belt 60 is driven with sprockets carried by shafts. The sprocket shafts may be encoded in a well-known manner, thus communicating to the controller when the belt 60 is passing over a nozzle. The controller may then be configured to time a corresponding valve such that a stream of fluid from the nozzle is in registry with a belt opening.

While compressed air has been described as one means of separating the portions, it will be appreciated that other fluids, including other gases and steam, as well as liquids such as water, could be used. One advantage of using a liquid as the fluid in the nozzle array of the present disclosure is that typically fluids, such as water, will result in far less energy consumption during the operation of the present system for harvesting cut portions PP. The pumps required to pressurize water are widely available and very reliable. Moreover, fluids such as water can be very accurately directed, and the relatively high density of the water medium results in significant momentum transfer to the portioned pieces.

Further, water flowing through the valves needed to control output from nozzles, such as nozzles 201, 204, and 205, results in fewer contaminants in the valves. Moreover, using water can result in more certainty that the apparatus of the present disclosure can be maintained in a sanitary condition. Water can be easily and inexpensively treated with chlorine or other chemicals to help insure that it does not contain harmful bacteria. It is also common and simple to test water for bacteria. It is less common and may be more difficult to filter or treat air used in compressed air systems, as well as more difficult and less common to test compressed air systems for harmful bacteria. Compressed air systems are designed to operate without water in the systems prior to compressing and distributing the air. As such compressed air systems are not amenable to sanitizing with common chemical sanitizing solutions. Further, compressed air systems in food plants may not be well maintained or designed, and during hot, humid weather relatively large amounts of water could drain or spray from the outlets of the systems. This untreated water in unsanitized pipes can contain harmful bacteria. Nonetheless, the present disclosure contemplates that the opening fluid could be compressed air or other compressed gases.

Higher pressure gases, such as from liquid nitrogen, or lower pressure gas, such as from a fan, are also within the scope of the present disclosure. Furthermore, combinations of lower pressure fluid in the nozzles and low pressure (vacuum) above the conveyor belt could be used to achieve the same result as higher pressure in the nozzles and atmospheric pressure above the conveyor belt. Nonetheless, the present disclosure contemplates that the operating fluid could be compressed air or other compressed gasses.

Figure 9:
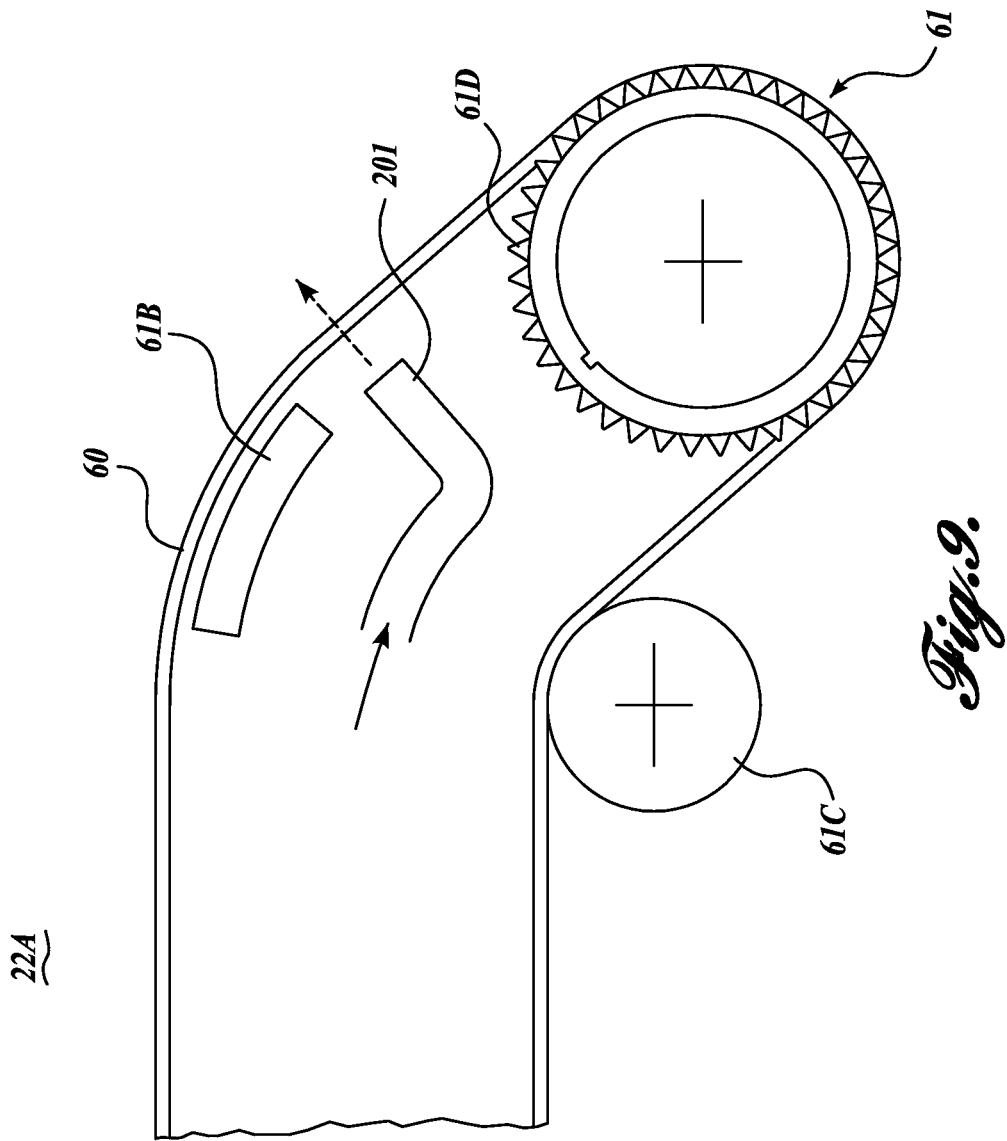
FIG. 9 is a schematic side elevation view of a further embodiment of the present disclosure; and, FIG. 10 is a schematic side elevation view of a further embodiment of the present disclosure utilizing rotating kickers/rollers to assist transfer of the final portion past a gap between two conveyor sections.

In the embodiment of the present disclosure showing FIGS. 3A and 3B, the nozzles 201 are illustrated as positioned within the envelope of outfeed roller assembly 61. This can lead to a quite complicated structure, especially to avoid interference between the nozzle 201 and its operation and the structure of a roller assembly 61. An alternative is to slope conveyor section 22A downward at its outfeed end, as shown in FIG. 9. Also, as shown in FIG. 9, a curved guide section 61B is positioned beneath the upper run of the conveyor belt 60, and a separate lower drive roller 61C is positioned below idler roller 61B. Also an idler roller 61C is positioned beneath the lower run of the conveyor belt 60 to direct the path of the lower run. It is to be appreciated that the curved guide section 61B could be replaced by one or more idler rollers, and correspondingly the idler roller 61C could be replaced by a curved guide section. With this construction, the nozzles 201 are not positioned within the envelope of idler roller 61B or drive roller 61C, but rather are simply positioned beneath the upper run of conveyor belt 60A. This can simplify the construction of the drive roller assembly 61 considerably. Of course, other alternatives for the construction of the outfeed end of conveyor section 22A can be utilized to eliminate having to position the nozzles 201 within the envelope of the outfeed roller assembly 61.

Figure 10:
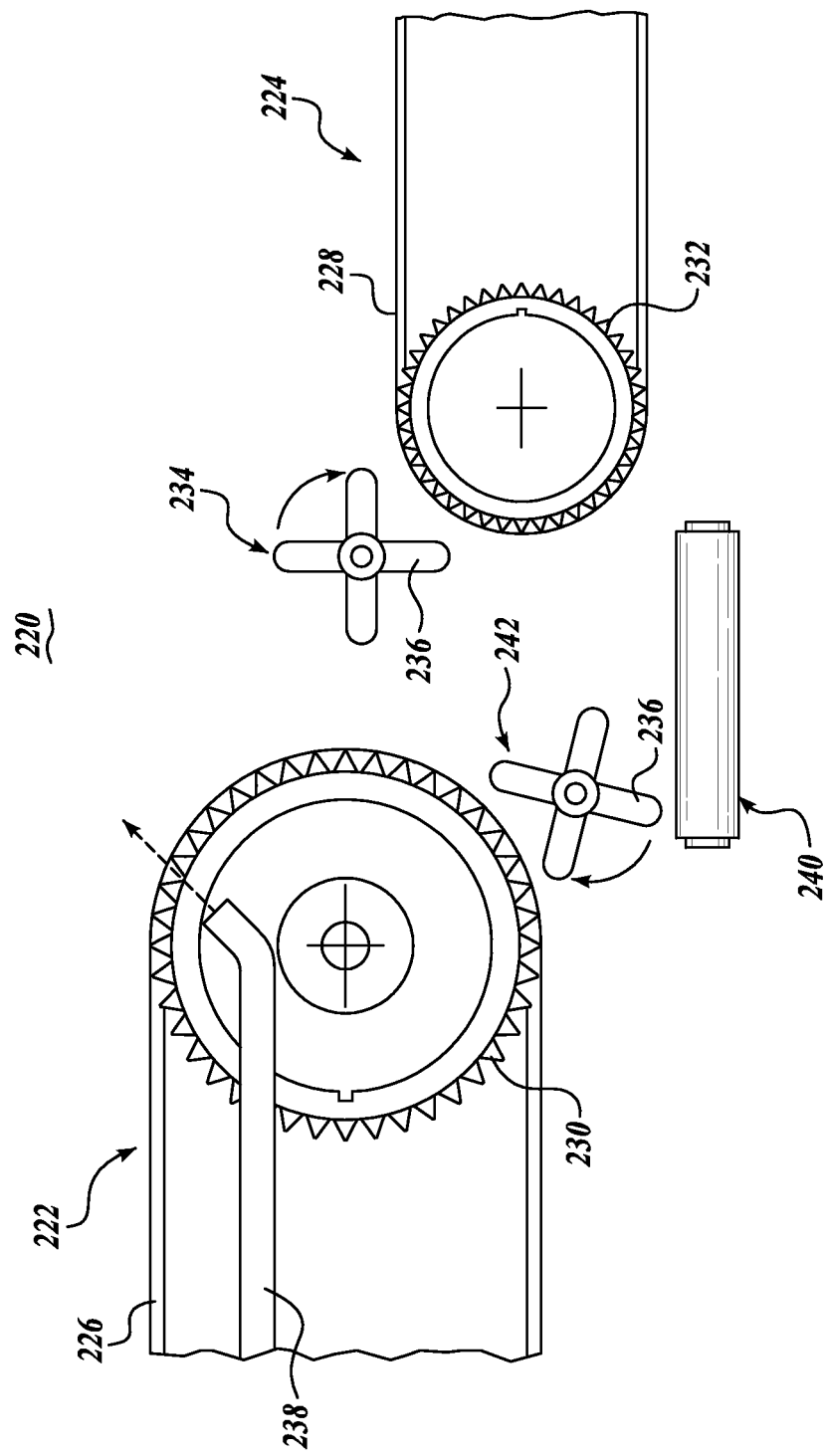

Another alternative embodiment construction of the present invention is shown in FIG. 10. In this embodiment, the discharge end of a first conveyor section 222 of conveyor 220 is at an elevation above the receiving end of a second conveyor section 224. Each conveyor section 222 and 224 includes an associated powered belt 226 and 228, respectively. A drive roller 230 of conveyor section 222 is engaged with belt 226, and an idler roller 232 of conveyor section 224 is engaged with conveyor section 224. A powered kicker roller 234 is positioned between the adjacent ends of the conveyor sections 222 and 224 at an elevation below the top run on belt 226 and above the top run of conveyor section 224. The kicker 234 roller includes a plurality of tynes 236 that project from the rotational axis of the kicker roller to grip or impale portions PP leaving conveyor section 222 and assist in propelling the portions to the receiving end of conveyor section 224. The speed of the kicker roller can be adjusted depending on various factors, such as the size and nature of the portions PP and the distance between conveyor section 222 and 224. In this manner the portions PP do not have to be propelled the entire distance from conveyor section 222 to section 224 solely via the fluid expelled from the nozzles 238 positioned at the drive roller 230. Also, the use of the kicker roller 234 allows the conveyor sections 222 and 224 to be spaced further apart from each other, so that a portion PP would not contact both conveyor sections at the same time.

Also as shown in FIG. 10, a transverse conveyor 240 is positioned between and below the adjacent ends of conveyor sections 222 and 224 to, for example, receive and transport trim material TP or portions PP of a different configuration from the portions PP that are transferred to receiving conveyor section 224. Also, a second kicker roller 242 is positioned below conveyor section 222 and above transverse conveyor to help assist the trim material TP or portions PP to reach the transverse conveyor.

The discussion above with respect to apparatus 20 focuses on selecting the applicable nozzle so as to direct a fluid stream to the centroid of a portion P. In this regard, the nozzles may be stationary, and thus the endeavor is to utilize the control system to activate the applicable nozzle at the correct timing. Also, the above discusses utilizing moveable nozzles so as to aim the fluid stream at the proper location(s). An alternative to the foregoing is to utilize stationary nozzles and laterally adjust or move the belt so as to bring the applicable nozzles into proper position for the fluid stream from the nozzles to impact the portions at the desired location(s) on the portions. Various configurations of conveyors could be utilized in this regard. For example, the outfeed end of a conveyor may be flexibly attached to the main portion of the conveyor and linear actuator utilized to move the outfeed end of the conveyor laterally as required. Such distance typically would not be very large, and thus a significant mis-alignment would not occur between the outfeed end of the conveyor and the rest of the conveyor. Similar movements of the outfeed conveyor relative to a stationary nozzle(s) may be accomplished with rotary actuators or servo motors with cam and gear drives.

Although the present disclosure has described and illustrated the receiving location(s) for the final pieces PP as one or more transverse conveyors, other types of receiving locations might be utilized, such as bins. An example of such bins includes bins 34 shown in FIG. 1. Also, a combination of transverse conveyors and storage bins could be employed.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for cutting a workpiece into final pieces and then transferring the final pieces to one or more desired receiving location(s) using a fluid stream, the system comprising:
   a conveyor configured to support and advance the workpiece;
   a vision system configured to ascertain selected physical parameters of the workpiece and generate data pertaining to the physical parameters of the workpiece, the data from the vision system used to determine how the workpiece is to be cut into one or more final pieces and to identify one or more positions on the final piece(s) as targets for the fluid stream;
   a cutter configured to cut the workpiece into the final pieces;
   at least one nozzle that is selectively activatable to discharge a stream of fluid therefrom, thereby to transfer the final pieces from the conveyor to the receiving location(s) when the at least one nozzle is activated;
   a controller configured to activate the at least one nozzle to direct the fluid stream at the target position(s) on the final pieces; and
   a vacuum subsystem positioned relative to the conveyor to apply a vacuum to the workpieces to hold the workpieces relative to the conveyor as the at least one nozzle discharges a stream of fluid at the target position(s) of the final pieces.

2. A system for cutting a physically variable food workpiece into final pieces and then transferring the final pieces to one or more desired receiving locations using one or more fluid streams, the system comprising:
   a conveyor configured to support and advance the food workpiece;
   a vision system configured to ascertain selected physical parameters of the food workpiece and generate data pertaining to the physical parameters of the food workpiece;
   a processor receiving data from the vision system, said processor using said data:
      (i) to determine how the food workpiece is to be cut into one or more final pieces; and
      (ii) to identify one or more positions on the final pieces as targets for the one or more fluid streams, said target positions calculated to cause the one or more fluid streams to transfer the final pieces to the one or more desired receiving locations, said target positions selected from the group including:
         a. the centroid of the one or more final pieces; and
         b. a plurality of positions on the final pieces balanced about the centroid of the one or more final pieces;
   a cutter downstream from the vision system configured to cut the food workpiece into the final pieces;
   one or more nozzles that are selectively activatable to discharge one or more streams of fluid therefrom through the conveyor to the one or more target positions, thereby to transfer the final pieces from the conveyor to the desired receiving location(s) when the one or more nozzles are activated, said one or more streams of fluid having a directional component in the upward direction to cause the final pieces to become airborne off the conveyor; and
   a controller configured to activate the one or more nozzle nozzles to direct the one or more fluid streams through the conveyor at the target positions on the final pieces.

3. The system of claim 2, wherein the conveyor is a first conveyor, and wherein the desired receiving location is a second conveyor.

4. The system of claim 3, wherein the second conveyor is positioned laterally to the first conveyor.

5. The system of claim 2, wherein the plurality of nozzles are arranged in a fixed pattern.

6. The system of claim 5, wherein the plurality of nozzles are arranged in an array extending laterally of the conveyor, and the controller is configured to selectively activate the nozzles to direct the fluid stream at the target position(s) on the final pieces.

7. The system of claim 6, wherein the nozzles are activated when the identified target position(s) of the final pieces is in registry with one or more of the nozzles of the plurality of nozzles.

8. A system for cutting a physically variable food workpiece into final pieces and then transferring the final pieces to one or more desired receiving locations using one or more fluid streams, the system comprising:
   a conveyor configured to support and advance the food workpiece;
   a vision system configured to ascertain selected physical parameters of the food workpiece and generate data pertaining to the physical parameters of the food workpiece;

a processor receiving the data from the vision system and using such data to determine how the food workpiece is to be cut into one or more final pieces and to identify one or more positions on the final piece(s) as targets for the fluid streams, said one or more target positions selected from the group consisting of:
  (i) the centroid of the final pieces; and
  (ii) positions on the final pieces that cooperatively define the centroid of the final pieces;
a cutter configured to cut the workpiece into the final pieces;
at least one nozzle, each nozzle selectively activatable to discharge a stream of fluid therefrom to the one or more target positions, thereby to cause the final pieces to become airborne off the conveyor and transfer the final pieces from the conveyor to the receiving location(s) when the at least one nozzle is activated;
a controller configured to activate the at least one nozzle to direct the one or more fluid streams at the target position(s) on the final pieces; and
wherein at least one nozzle is activated to direct the one or more fluid streams in a direction to lift the final pieces upward relative to off the conveyor, and at least one additional nozzle is activated to move the lifted final pieces to the receiving location.

9. The system of claim 2, comprising a plurality of receiving locations and a plurality of nozzles positioned relative to the conveyor to transfer the final pieces to selective receiving locations.

10. The system of claim 9, wherein the final pieces are moved to a specific location of the plurality of locations based on one or more physical attributes of the final pieces.

11. The system of claim 9, wherein the plurality of receiving locations are receiving conveyors.

12. A system for cutting a physically variable food workpiece into final pieces and then transferring the final pieces to one or more desired receiving location(s) using one or more fluid streams, the system comprising:
  a conveyor configured to support and advance the food workpiece;
  a vision system configured to ascertain selected physical parameters of the food workpiece and generate data pertaining to the physical parameters of the food workpiece;
  a processor receiving the data from the vision system and using such data to determine how the food workpiece is to be cut into one or more final pieces and to identify one or more positions on the final pieces as targets for the one or more fluid stream streams, said one or more target positions selected from the group consisting of:
    (i) the centroid of the final pieces; and
    (ii) positions on the final pieces that cooperatively define the centroid of the final pieces;
  a cutter configured to cut the food workpiece into the final pieces;
  at least one nozzle that is selectively activatable to discharge a stream of fluid therefrom of the one or more target positions, thereby to transfer the final pieces from the conveyor to the receiving location(s) when the at least one nozzle is activated by causing the final pieces to become airborne off the conveyor;
  a controller configured to activate the at least one nozzle to direct the fluid stream at the one or more target positions on the final pieces to cause the final pieces to become airborne; and
  a backstop positioned relative to and extending upward relative to the receiving location(s) to assist in directing the airborne final pieces transferred from the conveyor to the receiving location(s).

13. The system of claim 2, wherein the conveyor comprises an outfeed end portion and a roller assembly at the outfeed end portion of the conveyor to drive or guide the conveyor, and wherein the at least one nozzle is located distal from the roller assembly.

14. The system of claim 2, wherein the conveyor comprises at least one section sloped in a downward direction and the at least one nozzle is positioned relative to the conveyor at the sloped section of the conveyor.

15. A system for harvesting final pieces cut from physically variable food workpieces utilizing one or more streams of fluid directed at the final pieces as the food workpieces and one or more final pieces cut from the food workpieces are being carried by a conveyor, comprising:
  a scanning subsystem for scanning the final pieces and generating data pertaining to the physical characteristics of the final pieces;
  a processor for receiving the data from the scanning subsystem and using such data to identify one or more target positions on the final pieces for the one or more streams of fluid, said one or more target positions calculated to cause the one or more fluid streams to transfer the final piece(s) to the one or more desired receiving locations, said one or more target positions selected from the group consisting of:
    (i) the centroid of the final pieces; and
    (ii) positions on the final piece that cooperatively define the centroid of the final piece;
  a plurality of nozzles that can be selectively activated to emit one or
  more streams of fluid therefrom through the conveyor;
  a controller configured to activate one or more nozzles of the plurality of nozzles to direct the one or more streams of fluid at the one or more target positions on the final pieces to lift the final pieces off the conveyor to become airborne and propel the final pieces from the conveyor to one or more desired receiving, locations; and
  wherein the one or more streams of fluid has a directional component in the upward direction.

16. A system for sorting food workpieces of variable physical dimensions by transferring variable food workpieces to one or more desired receiving location(s) using one or more fluid streams, the system comprising:
  a conveyor configured to support and advance the food workpiece;
  a vision system configured to ascertain selected physical parameters of the food workpiece and generate data pertaining to the physical parameters of the food workpiece;
  a processor receiving the data from the vision system and using such data to identify one or more positions on the food workpiece as targets for the one or more fluid streams, said target positions calculated to cause the one or more fluid streams to transfer the food workpiece to the one or more desired receiving locations, said target positions selected from the group consisting of
    (i) the centroid of the food workpiece; and
    (ii) positions on the food workpiece that cooperatively define the centroid of the food workpiece;
  at least one nozzle that is selectively activatable to discharge a stream of fluid therefrom through the conveyor to the one or more target positions, thereby to transfer the food workpiece from the conveyor to the receiving location when the at least one nozzle is activated, said stream of fluid having a directional component in the upward direction to lift the food workpiece off the conveyor to become airborne; and a controller configured to activate the at least one nozzle to direct the fluid stream at the target position(s) on the food workpiece.

17. The system of claim 16, wherein the at least one nozzle is a plurality of nozzles and the controller is configured to selectively activate the nozzles of the plurality of nozzles to direct at least one stream of fluid at the one or more target positions on the food workpiece.

18. The system of claim 8, wherein the conveyor is a first conveyor, and wherein the desired receiving location is a second conveyor.

19. The system of claim 8, wherein the at least one nozzle is a plurality of nozzles arranged in an array extending laterally of the conveyor; and the controller is configured to selectively activate the nozzles to direct the fluid stream at the one or more target positions on the final pieces.

20. The system of claim 12, wherein the conveyor is a first conveyor, and wherein the desired receiving location is a second conveyor.

21. The system of claim 12, wherein the at least one nozzle is a plurality of nozzles arranged in an array extending laterally of the conveyor; and the controller is configured to selectively activate the nozzles to direct the fluid stream at the one or more target positions on the final pieces.

22. The system of claim 1, wherein the conveyor is a first conveyor, and wherein the desired receiving location is a second conveyor.

23. The system of claim 1, wherein the at least one nozzle is a plurality of nozzles arranged in an array extending laterally of the conveyor; and the controller is configured to selectively activate the nozzles to direct the fluid stream at the one or more target positions on the final pieces.

24. The system of claim 15, wherein the conveyor is a first conveyor, and wherein the desired receiving location is a second conveyor.

25. The system of claim 16, wherein the conveyor is a first conveyor, and wherein the desired receiving location is a second conveyor.

* * * * *